United States Patent [19]
Ogawa et al.

[11] Patent Number: 4,525,049
[45] Date of Patent: Jun. 25, 1985

[54] MOTOR DRIVING DEVICE OF A CAMERA

[75] Inventors: Harumi Ogawa; Fumito Obikawa, both of Chino; Toshio Koyama, Suwa; Yoshiaki Otsubo, Yokohama; Hiroshi Wakabayashi, Yokohama; Tadashi Otani, Yokohama, all of Japan

[73] Assignee: Nippon Kogaku K.K., Tokyo, Japan

[21] Appl. No.: 538,423

[22] Filed: Oct. 3, 1983

[30] Foreign Application Priority Data
Oct. 20, 1982 [JP] Japan .................................. 57-182996

[51] Int. Cl.$^3$ ................................................ G03B 1/18
[52] U.S. Cl. .................... 354/173.11; 354/212
[58] Field of Search .............. 354/173.11, 212, 213, 354/217, 218

[56] References Cited
U.S. PATENT DOCUMENTS

| | | | |
|---|---|---|---|
| 3,927,413 | 12/1975 | Kimura et al. | 354/173.11 |
| 4,190,340 | 2/1980 | Maida | 354/173.11 |
| 4,451,150 | 5/1984 | Maida | 354/173.11 |
| 4,457,606 | 7/1984 | Ishizuki et al. | 354/173.11 |
| 4,465,351 | 8/1984 | Tominaga | 354/173.11 |

FOREIGN PATENT DOCUMENTS
108838 10/1982 Japan .

Primary Examiner—Russell E. Adams
Attorney, Agent, or Firm—Shapiro and Shapiro

[57] ABSTRACT

A device for flowing a driving current to a motor to drive the motor comprises a capacitor and means responsive to the charging current flowing into the capacitor to supply the driving current to the motor. The responsive includes charging means for supplying the charging current to the capacitor and means for discharging the charge charged in the capacitor during the supply of the driving current to the motor.

10 Claims, 2 Drawing Figures

MOTOR DRIVING DEVICE OF A CAMERA

BACKGROUND OF THE INVENTION

1. Field of the Invention

This invention relates to a motor driving device of a camera.

2. Description of the Prior Art

A motor driving circuit of this type is disclosed in Japanese Laid-open Patent Application No. 108838/1982. This motor driving circuit of an electric camera according to the prior art has a capacitor for starting the motor, and a power supply holding circuit energized by a charging current flowing to the capacitor to start the power supply to the motor which drives a film winding-up mechanism, etc. and hold the power supply to the motor even after the charging current has decreased. The charging and discharging of this starting capacitor are controlled by a switch changed over in response to depression of a shutter release button. That is, the discharging path of the capacitor is formed in response to the change-over of the switch corresponding to the depression of the shutter release button, and the charging path of the capacitor is formed in response to the change-over of the switch corresponding to the completion of the shutter release.

In such a circuit, however, the discharging path of the starting capacitor is formed separately and independently and moreover by a switch having contacts, and this leads to the complexity of the circuit construction. Also, it is necessary to adjust the switch so as to ensure the discharging path to be formed, and further, there has been the undesirable possibility that the discharging path fails to be formed due to dust or stain adhering to the contacts of the switch end re-starting of the motor becomes impossible.

SUMMARY OF THE INVENTION

It is an object of the present invention to provide a motor driving device of a camera which is simple in construction and reliable in operation.

To this end, according to the present invention, a no-contact discharging path of the capacitor is provided in the power supply holding circuit and this path is adapted to be closed during the power supply holding of the circuit, namely, during the driving of the motor.

The invention will become more fully apparent from the following detailed description thereof taken in conjunction with the accompanying drawings.

DESCRIPTION OF THE PREFERRED EMBODIMENTS

Figure 1:
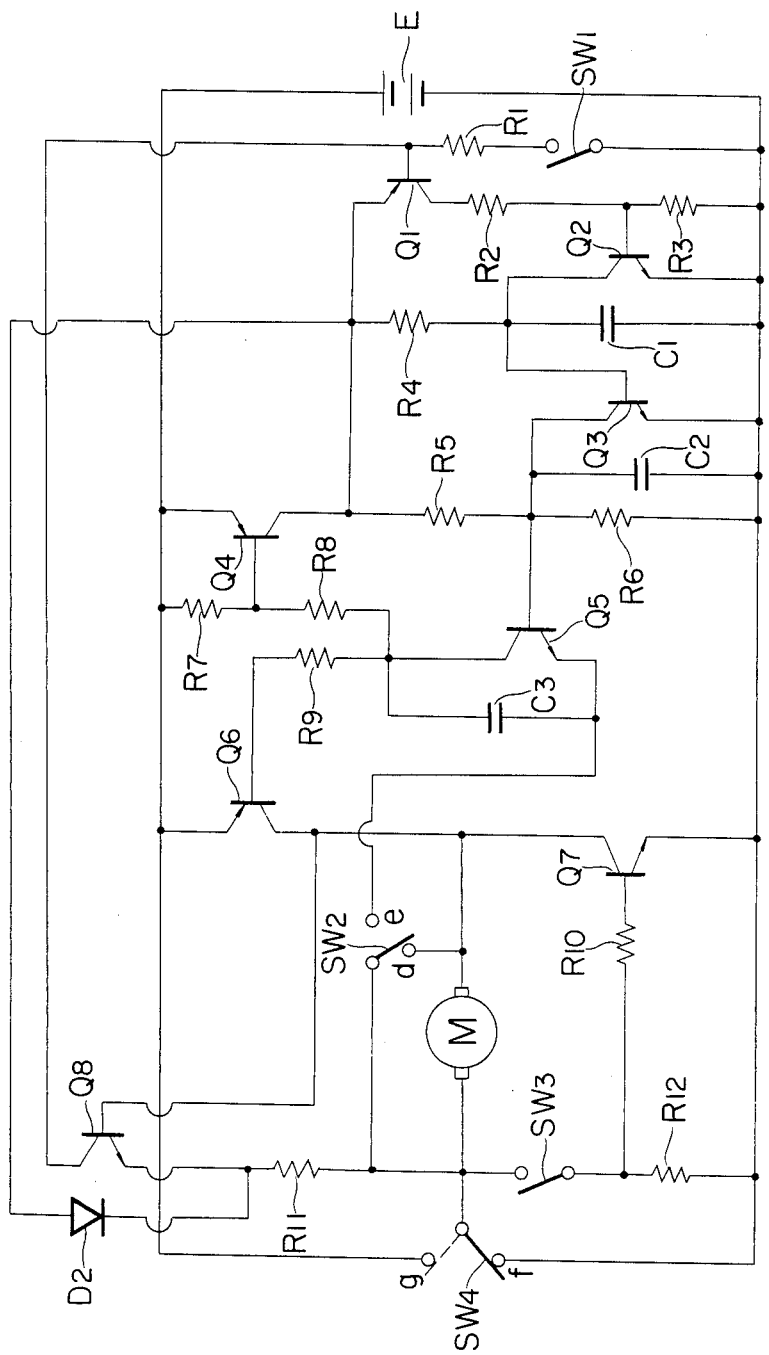
FIG. 1 diagrammatically shows the circuit construction of an automatic film driving device according to an embodiment of the present invention.

Referring to FIG. 1, it diagrammatically shows the construction of the motor driving device of a camera according to an embodiment of the present invention.

A switch SW1 is a back lid switch for preventing a wrong operation or overload detection by an inadvertent load operation of a film driving system from being effected when a camera's back lid for film insertion is opened, and is adapted to be closed by opening of the back lid and to be opened by closing of the back lid. A switch SW2 is a wind-up switch adapted to be changed over to the e side upon termination of the operation of a shutter and to the d side upon completion of the feeding of one frame of a film, and is forcibly connected to the e side during the rewinding of the film. A switch SW3 is a film detecting switch provided, for example, near the surface of the film rail of the camera, and is adapted to be closed when the film is present and to be opened when the film is absent, and is concerned in the automatic stoppage during termination of film rewinding. A switch SW4 is a change-over switch adapted to be connected to the f side during winding-up and to be connected to the g side during rewinding. A capacitor C3 is a starting capacitor which starts to be charged by the wind-up switch SW2 being changed over from the d side to the e side. Transistors Q4–Q6 together constitute a power supply holding circuit. When the charging of the starting capacitor C3 is started, the base current of the transistor Q4 flows and the transistor Q4 becomes conductive. At the same time, part of the collector current of the transistor Q4 becomes the base current of the transistor Q5 and the transistor Q5 also becomes conductive. Thereby, a latch circuit comprising the transistors Q4 and Q5 is operated. The base current of the transistor Q6 flows to the capacitor C3 through a resistor 9, the transistor Q6 becomes conductive and a motor M is started. From before the transistors Q4 and Q6 become conductive, the base current of the transistor Q4, the current from a resistor R7 and the base current of the transistor Q6 flow in as the charging current of the starting capacitor C3. If the electrostatic capacity of the starting capacitor C3 is sufficiently great and the parameter hfe of the transistor Q6 is sufficiently great and the base current of this transistor is sufficiently small, the base current of the transistor Q4 sufficient to render the transistor Q4 conductive may flow as the charging current of the starting capacitor C3. When the latch circuit comprising the transistors Q4 and Q5 is operated and these two transistors are maintained conductive, the collector-emitter voltage of the transistor Q5 becomes minute and thus, the starting capacitor C3 charged by the charging current is caused to discharge by the transistor Q5. Re-starting of the starting capacitor C3 discharged during winding-up is reliably effected because when the switch SW2 is changed over to the d side upon completion of winding-up, there is no loop charged till the next starting. A transistor Q8 is a detecting transistor. The base of the transistor Q8 is connected to the collector of the driving transistor Q6 and the emitter of the transistor Q8 is connected to the junction between a diode D2 and a resistor R11. The resistor R11 is preset so as to suitably determine the overcurrent detection level of a detecting transistor Q8. Transistors Q1, Q2 and resistors R2, R3 together constitute a control circuit, and a resistor R4 and a capacitor C1 together constitute an integrating circuit. That is, when the detecting transistor Q8 is conductive, both of the transistors Q1 and Q2 conduct and short-circuit the both ends of the capacitor C1 and therefore, the subsequent transistor Q3 is in non-conductive state and the latch circuit continues its operative condition. When the detecting transistor Q8 is rendered non-conductive, the transistors Q1 and Q2 become non-conductive and, when the capacitor C1 of the integrating circuit is charged to a predetermined amount, the transistor Q3 becomes conductive and renders the transistor Q5 non-conductive, so that the latch circuit becomes inoperative. A capacitor C2 provides a low-pass filter and prevents any malfunctioning resulting from noise. On the other hand, a transistor Q7 is a driving transistor for film rewinding.

Operation will now be described.

(The case of normal wind-up)

When a film is inserted into the camera and the back lid of the camera is closed, the switch SW1 becomes open and the switch SW3 becomes closed. The switch SW4 is connected to the f side. By the operator operating a shutter release member, not shown, in this state, the shutter is operated and, by the wind-up switch SW2 being changed over to the e side by a member or the like displaced upon termination of the operation of the shutter, the transistors Q4 and Q5 of the latch circuit are rendered conductive in response to the starting pulse by the starting capacitor C3, and the motor M starts to revolve by the power supply by the driving transistor Q6 and the film winding-up operation is effected. When the motor M is started, it sometimes happens that a rush current flows and the detecting transistor Q8 momentarily becomes non-conductive, but this is absorbed into the integrating circuit R4, C1 and the shift of the latch circuit to its inoperative state is prevented. From this time onward, the transistor Q8 maintains its conductive state and therefore, the integrating circuit is rendered inoperative. When one frame of the film is fed and the wind-up switch SW2 is connected to the d side, the motor M is short-circuited and immediately stopped and the latch circuit also becomes inoperative, thus completing one frame winding-up operation.

(When an overload occurs to the motor in the course of film winding-up)

Assuming that the emitter-collector voltage of the transistor Q4 is $V_{CE(Q4)}$, that the voltage appearing across the diode D2 is $V_{(D2)}$, that the base-emitter voltage of the detecting transistor Q8 is $V_{BE(Q8)}$ and that the emitter-collector voltage of the driving transistor Q6 is $V_{CE(Q6)}$, there is a relation that $V_{BE(Q8)} = \{V_{CE(Q4)} + V_{(D2)}\} - V_{CE(Q6)} \ldots$ (3). Here, when an overload is applied to the motor M and an overcurrent is created, $V_{CE(Q6)}$ becomes great and $V_{BE(Q8)}$ falls below the threshold level of the detecting transistor Q8 from equation (3) and therefore, the transistor Q8 becomes non-conductive. Thereupon, the transistors Q1 and Q2 of the control circuit become non-conductive and the integrating circuit R4, C1 starts to operate and the capacitor C1 is charged to a predetermined amount, whereby the transistor Q3 becomes conductive and the transistor Q4 becomes non-conductive, so that the latch circuit becomes inoperative and the transistor Q6 becomes non-conductive and thus, the power supply to the motor M is cut off and the winding-up is automatically stopped. At the same time, the power supply to the motor control circuit such as transistors Q1, Q2, Q3 is also cut off.

(The case of film rewinding)

Rewinding of the film is accomplished by the change-over switch SW4 being changed over to the g side. At this time, the wind-up switch SW2 is forcibly changed over to the e side in response to the change-over of the switch SW4. By this change-over operation, the driving transistor Q7 for rewinding is rendered conductive, whereby reverse revolution of the motor M is started and rewinding of the film is effected. The film is rewound and no longer the film detecting switch SW3 detects the film, whereby the transistor Q7 is rendered non-conductive and thus, the rewinding is automatically terminated.

Figure 2:
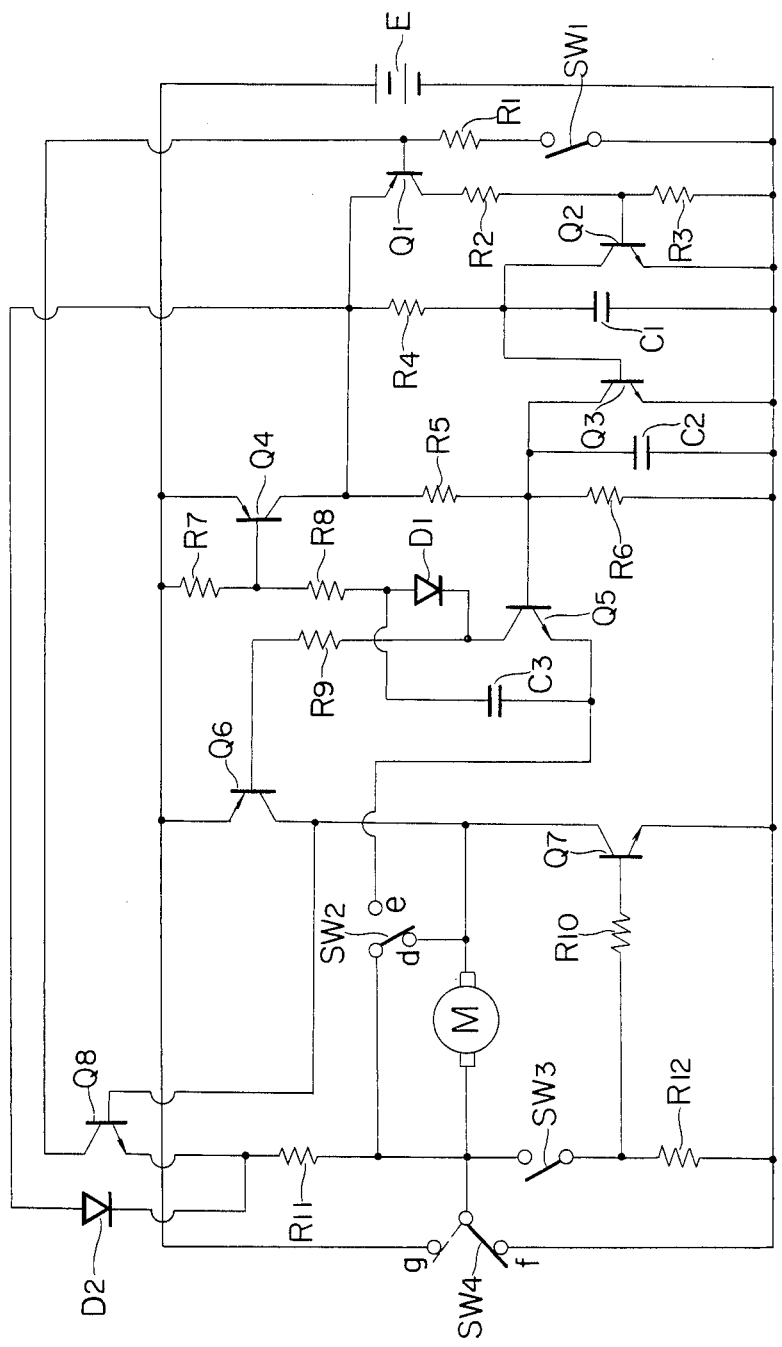
FIG. 2 diagrammatically shows the circuit construction of an automatic film driving device according to another embodiment of the present invention.

FIG. 2 shows another embodiment of the present invention. The construction of this embodiment is similar to the construction of the embodiment shown in FIG. 1 with the exception that a diode D1 is provided. The anode of the diode D1 is connected to a resistor R8 and one terminal of a capacitor C3, and the cathode of the diode D1 is connected to a resistor R9 and the collector of a transistor Q5. The present embodiment is similar to the embodiment of FIG. 1 in that one terminal of a starting capacitor C3 is connected to the emitter of the transistor Q5. The difference of the present embodiment from the FIG. 1 embodiment is that the other terminal of the capacitor C3 is connected to the junction between the resistor 8 and the anode of the diode D1. Due to this fact, the charging current of the capacitor C3 during its starting does not directly become the base current of a transistor Q6. Accordingly, the starting capacitor C3 may be of a smaller capacity than in FIG. 1, and this leads to advantages in respect of space and cost. Also, when the starting capacitor C3 is charged during its starting, a transistor Q5 becomes conductive during winding-up and therefore, the charge in the starting capacitor C3 is discharged through the discharge diode D1 and the effect of the preparation for re-starting similar to that in the FIG. 1 embodiment is obtained. In the other points, the operation of the present embodiment is entirely similar to that of FIG. 1 embodiment.

We claim:

1. A device for flowing a driving current to a motor to drive the motor, comprising:
   (a) capacitor means charged with charge, said capacitor means producing a voltage corresponding to the charged charge; and
   (b) supplying means responsive to the charging current flowing into said capacitor means to supply the driving current to said motor, said supplying means including charging means for supplying the charging current to said capacitor means and means for discharging the charge charged in said capacitor means during the supply of the driving current to said motor.

2. A device according to claim 1, wherein said supplying means includes switch means adapted to conduct by the charging current flowing into said capacitor means by said charging means, and said discharging means discharges the charge charged in said capacitor means upon conduction of said switch means.

3. A device according to claim 1, wherein said supplying means further includes:
   (a) first semiconductor switch means adapted to conduct by the charging current flowing into said capacitor means by said charging means;
   (b) second semiconductor switch means adapted to conduct by the conduction of said first semiconductor switch means; and
   (c) third semiconductor switch means adapted to conduct by the current flowing into said capacitor means by said charging means and supply the driving current to said motor.

4. A device according to claim 3, wherein said discharging means includes said second semiconductor switch means.

5. A device according to claim 1, wherein said supplying means further includes:
   (a) first semiconductor switch means adapted to conduct by the charging current flowing into said capacitor means by said charging means;
   (b) second semiconductor switch means adapted to conduct by the conduction of said first semiconductor switch means; and
   (c) third semiconductor switch means adapted to conduct by the conduction of said second semiconductor switch means and supply the driving current to said motor.

6. A device according to claim 5, wherein said first semiconductor switch means includes a first bipolar transistor, said second semiconductor switch means includes a second bipolar transistor different in polarity from said first bipolar transistor and a diode, said third semiconductor switch means includes a third bipolar transistor of the same polarity as said first bipolar transistor, said second bipolar transistor and said diode are connected so as to form a loop for discharging of said capacitor means during the conduction of said second transistor, and said diode prevents the charging current to said capacitor means from flowing to said third bipolar transistor.

7. A device according to claim 1, wherein said supplying means further includes:
   (a) means for detecting that the driving current of said motor is above a predetermined value; and
   (b) means operated to stop the supply of the driving current of said motor when the driving current of said otor is above said predetermined value.

8. A motor driving device of a camera for winding up one frame after the exposure of a film, comprising:
   (a) switch means changeable over to a first and a second state;
   (b) capacitor means charged with charge in response to the change-over of said switch means from said first state to said second state; and
   (c) supplying means responsive to a charging current flowing into said capacitor means to supply a driving current to said motor, said means including charging means for supplying the charging current to said capacitor means, and means for discharging the charge charged in said capacitor means during the supply of the driving current to said motor.

9. A device according to claim 8, wherein said switch means is changed over from said first state to said second state upon termination of the exposure of each one frame of said film and changed over from said second state to said first state upon completion of the feeding of each one frame of said film.

10. A device according to claim 8, wherein said supplying means includes a power supply and said switch means when in said first state short-circuits said motor and when in said second state connects said capacitor means to said power supply.

* * * * *